Sept. 4, 1928.
A. T. KOPPE
1,682,845
PHOTO COMPOSING MACHINE
Filed Jan. 21, 1925
8 Sheets-Sheet 2
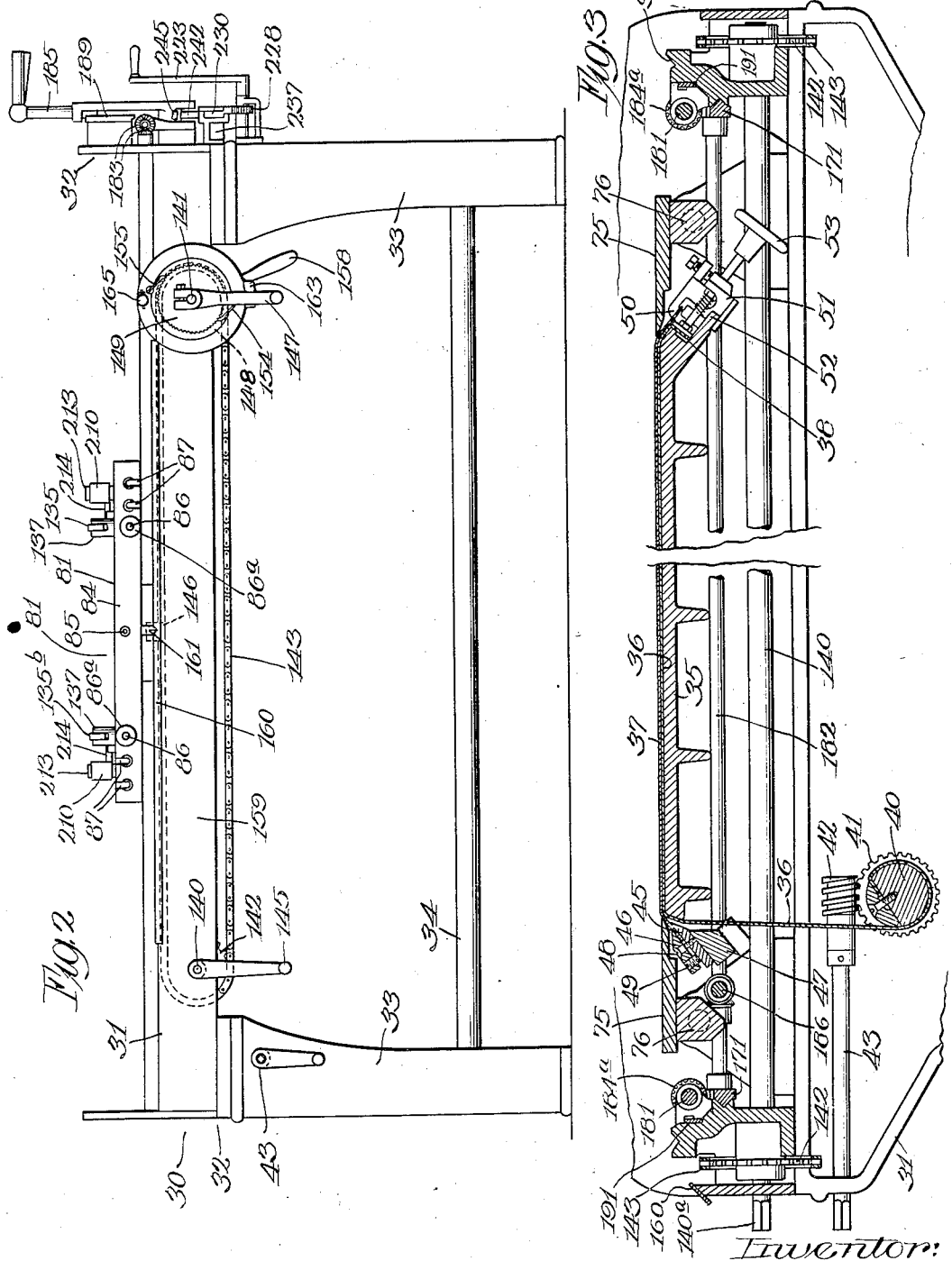
Inventor:
Alexander T. Koppe
By Rector, Hibben, Davis and Macauley
Attys.

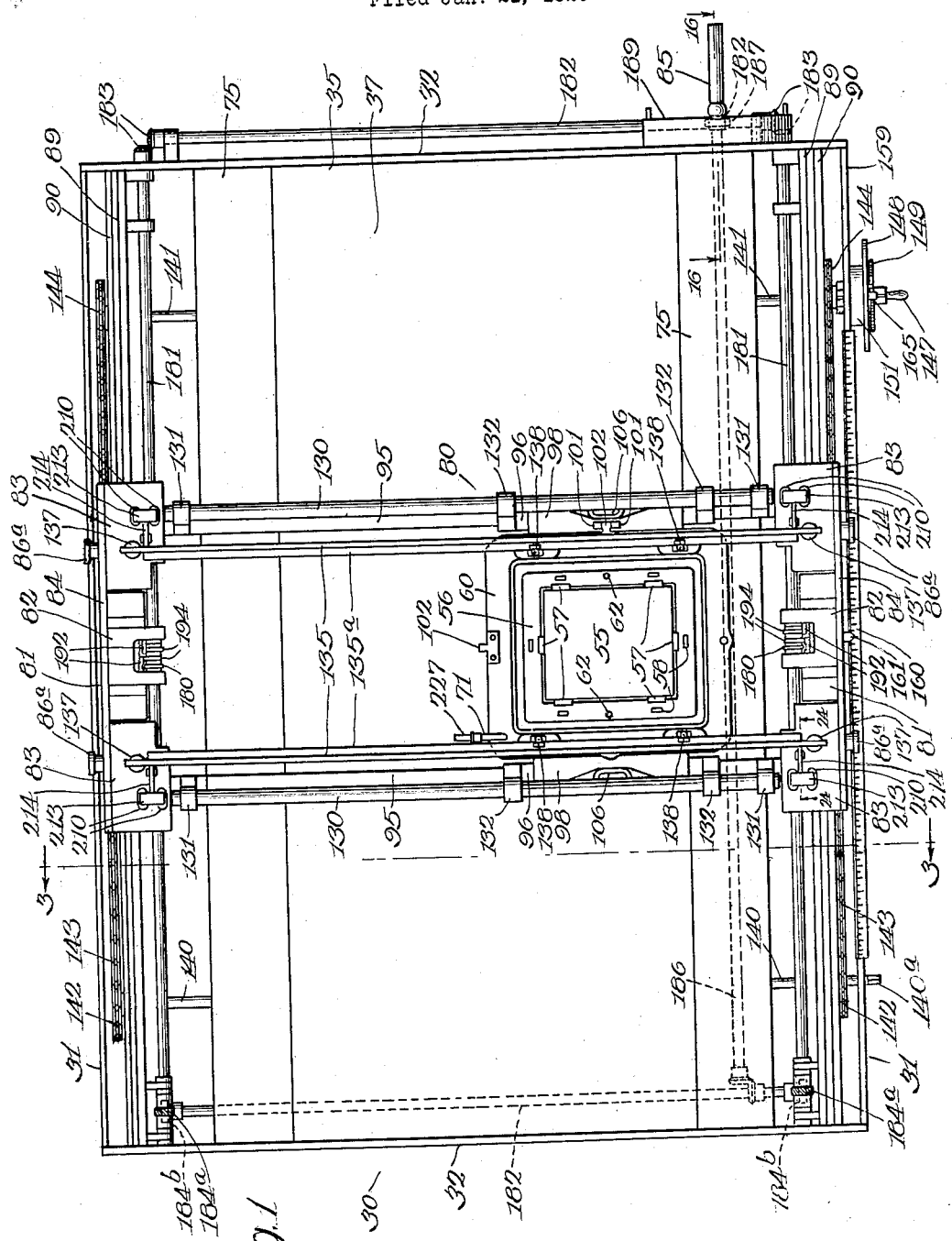

Sept. 4, 1928.  
A. T. KOPPE  
1,682,845  
PHOTO COMPOSING MACHINE  
Filed Jan. 21, 1925  
8 Sheets-Sheet 3
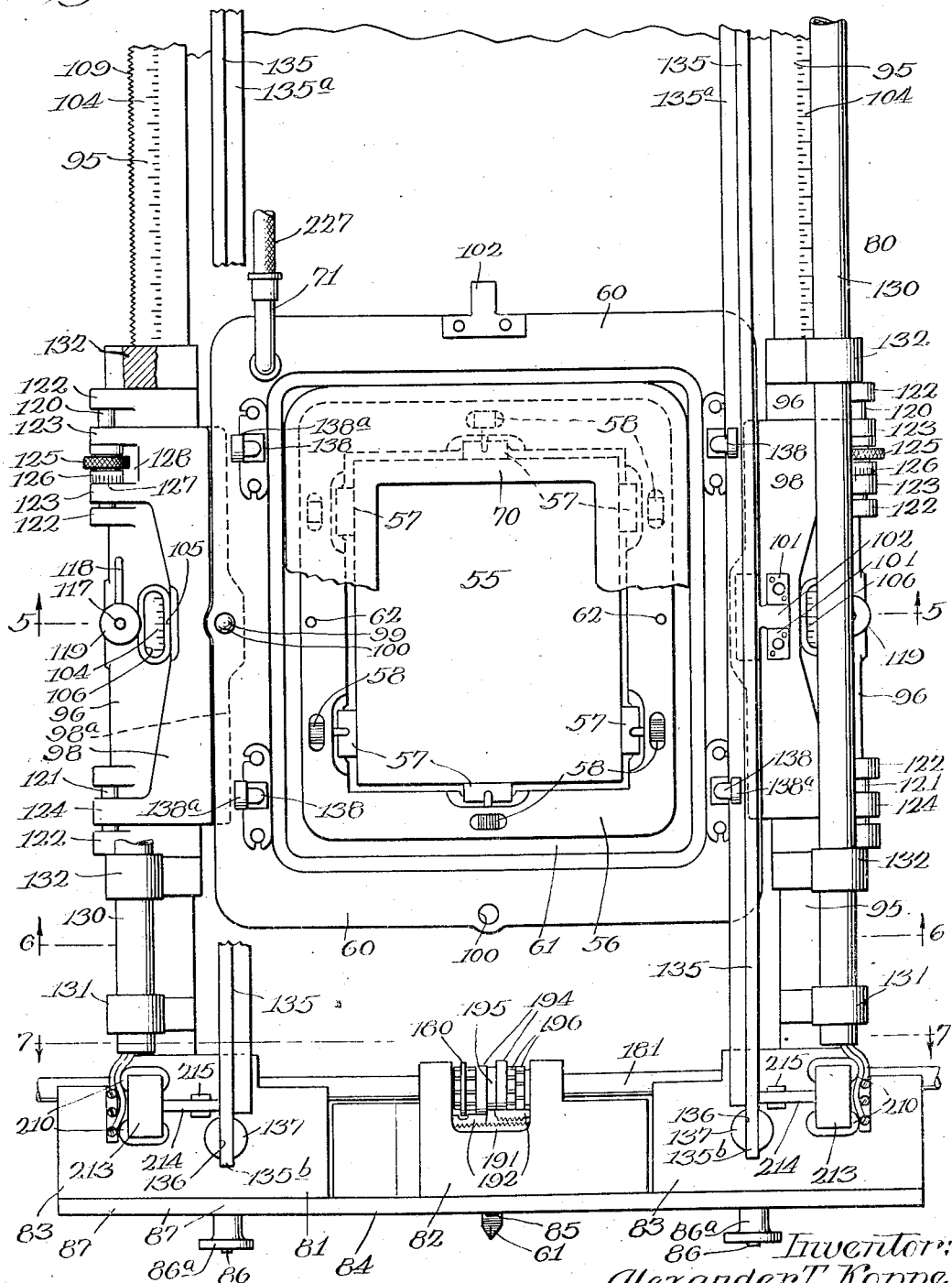

Sept. 4, 1928.                        A. T. KOPPE                    1,682,845
                                PHOTO COMPOSING MACHINE
                                 Filed Jan. 21, 1925          8 Sheets-Sheet 4
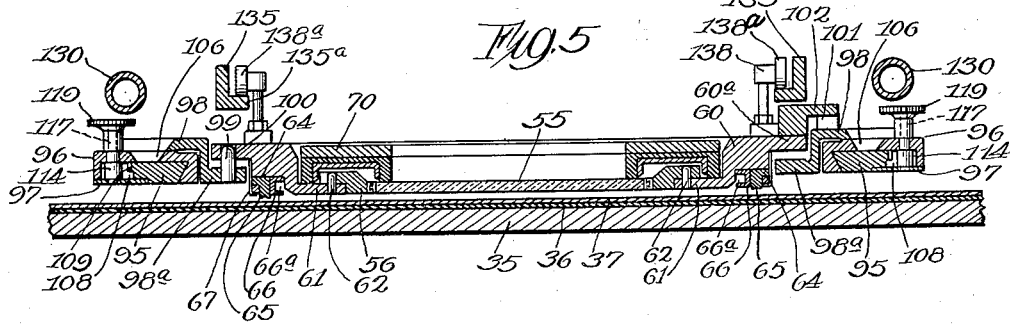
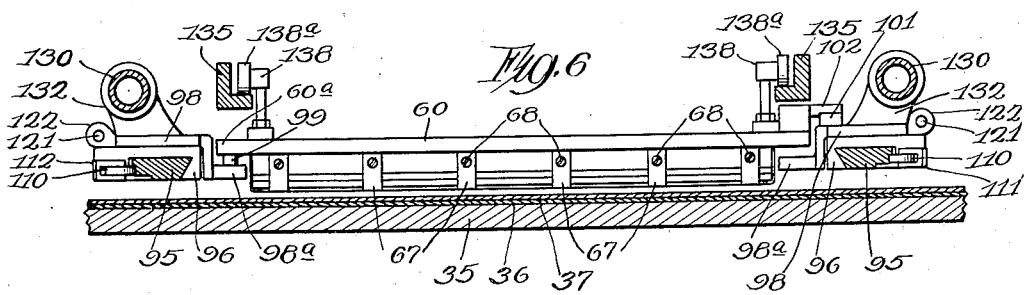
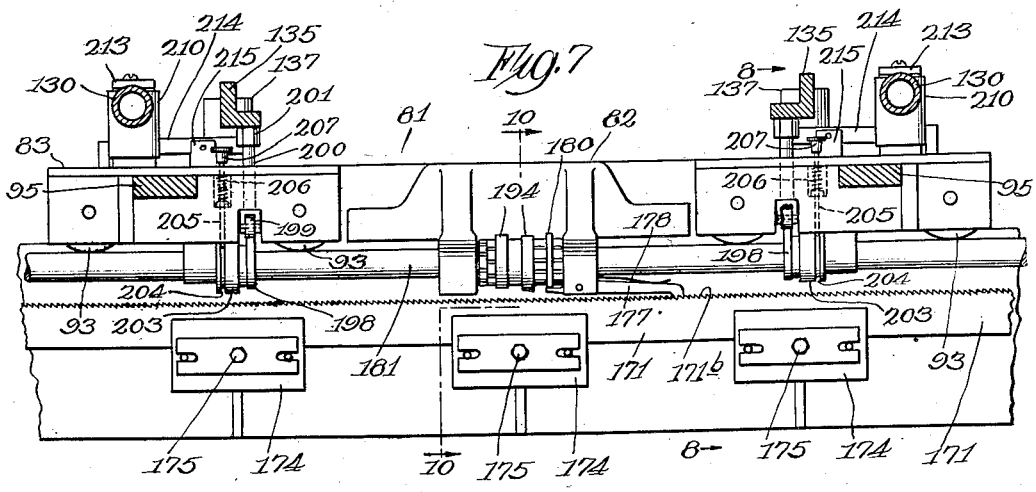
Inventor:
Alexander T. Koppe
By Rector, Hibben, Davis and Macauley
Attys.

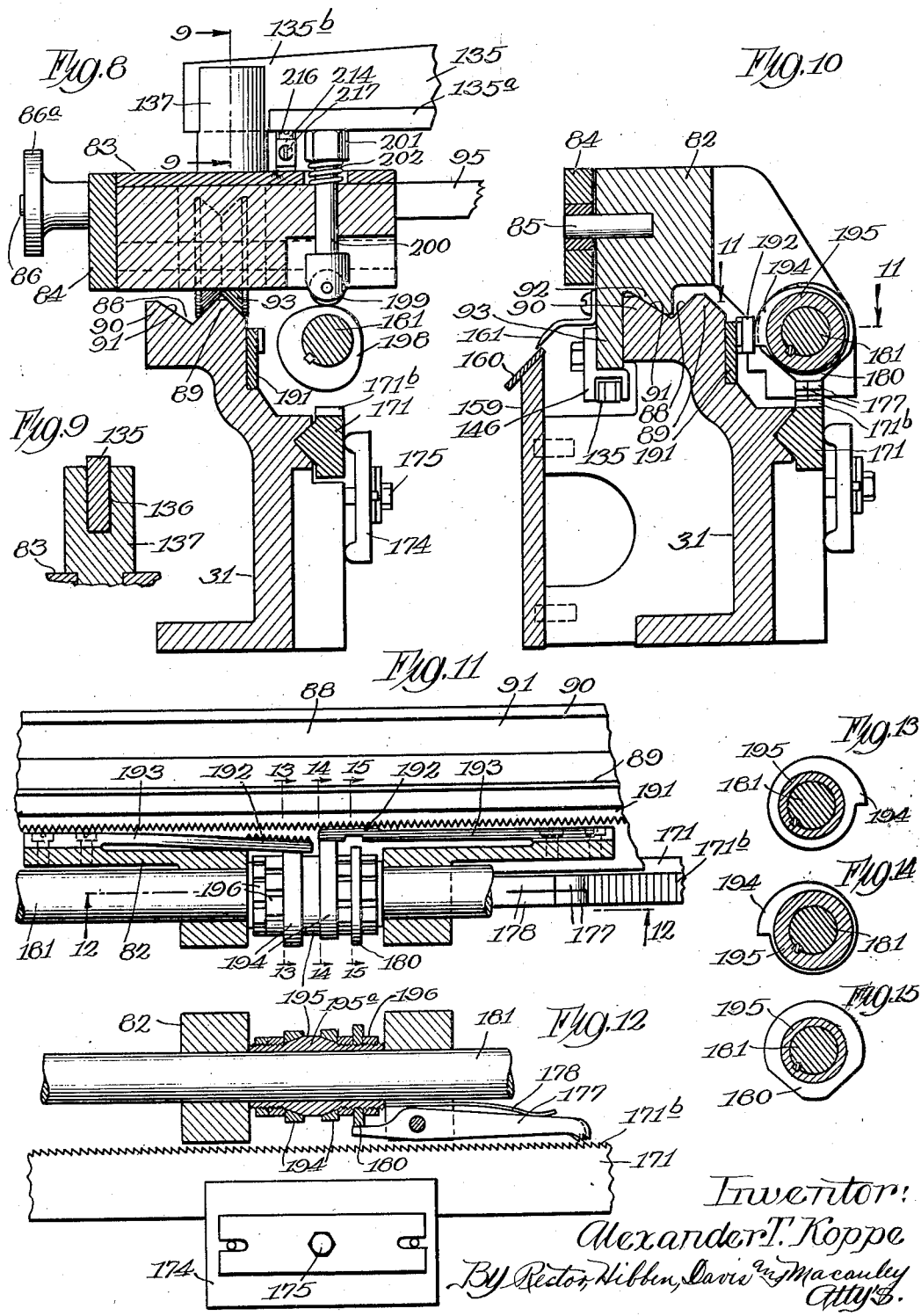

Sept. 4, 1928.
A. T. KOPPE
PHOTO COMPOSING MACHINE
Filed Jan. 21, 1925
1,682,845
8 Sheets-Sheet 6
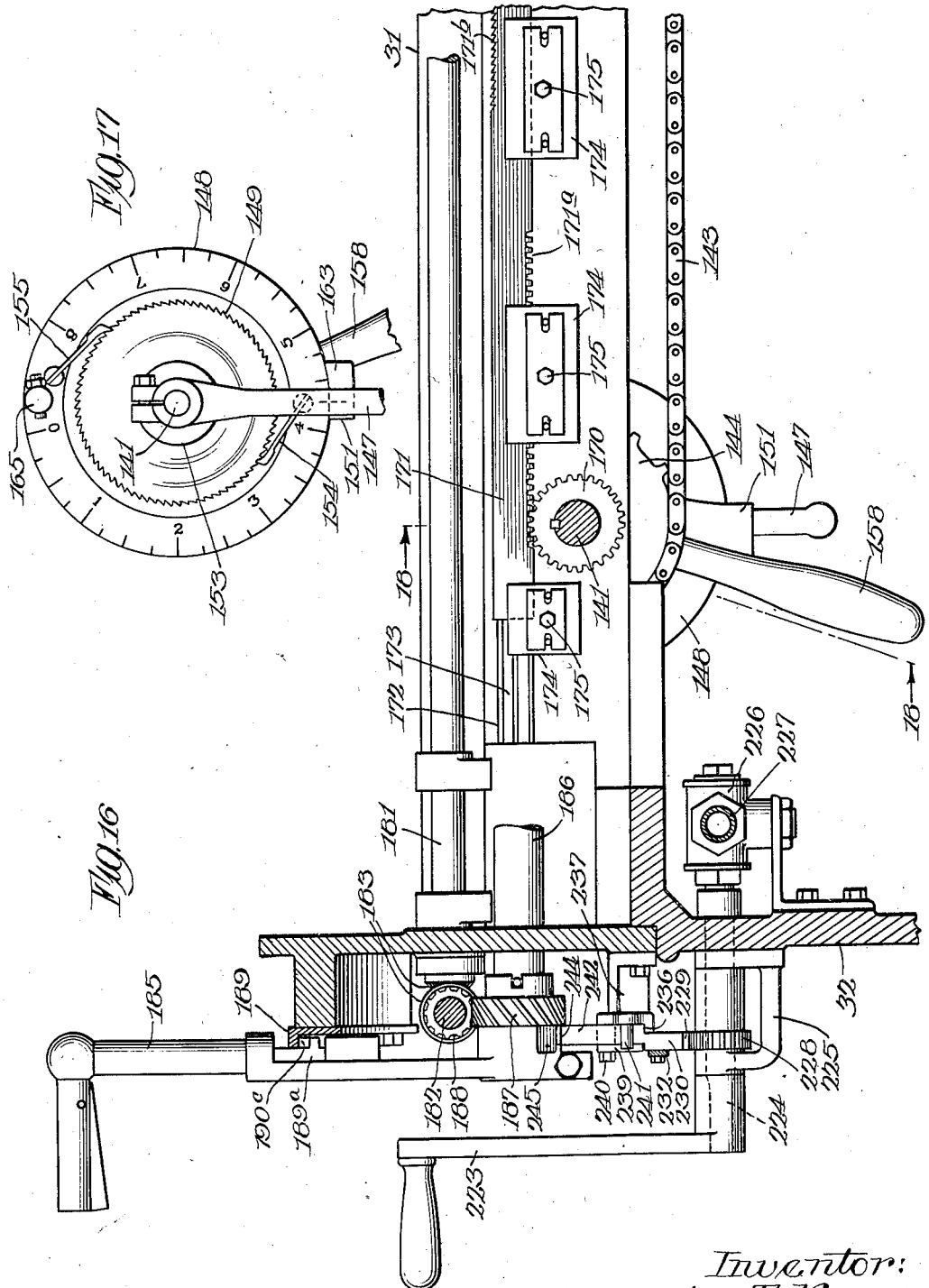
Inventor:
Alexander T. Koppe
By Rector, Hibben, Davis & Macauley
Atty's.

Sept. 4, 1928.
A. T. KOPPE
1,682,845
PHOTO COMPOSING MACHINE
Filed Jan. 21, 1925    8 Sheets-Sheet 7
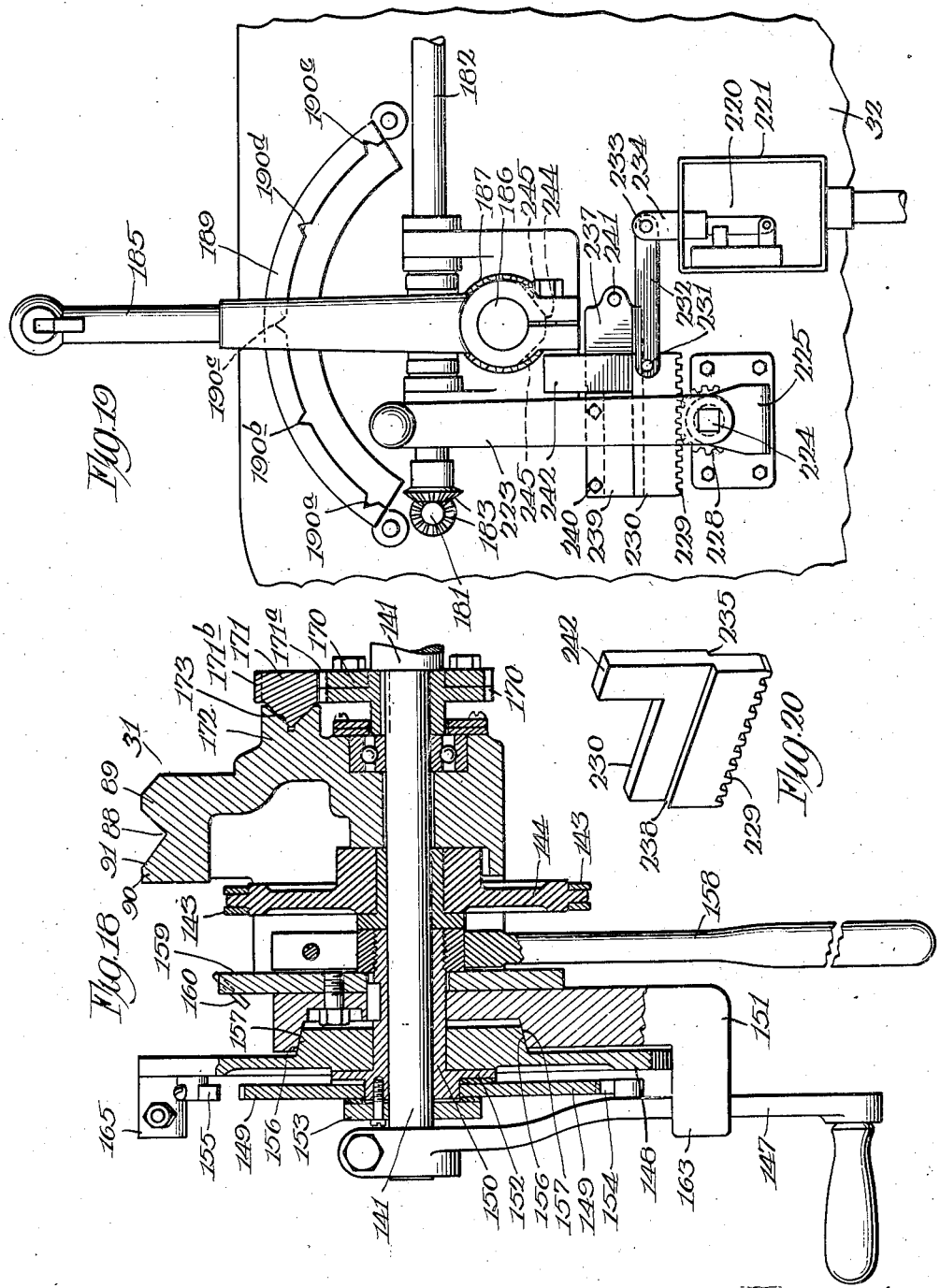
Inventor:
Alexander T. Koppe
By Rector, Hibben, Davis and Macauley
Attys.

Sept. 4, 1928.
A. T. KOPPE
1,682,845
PHOTO COMPOSING MACHINE
Filed Jan. 21, 1925　　8 Sheets-Sheet 8
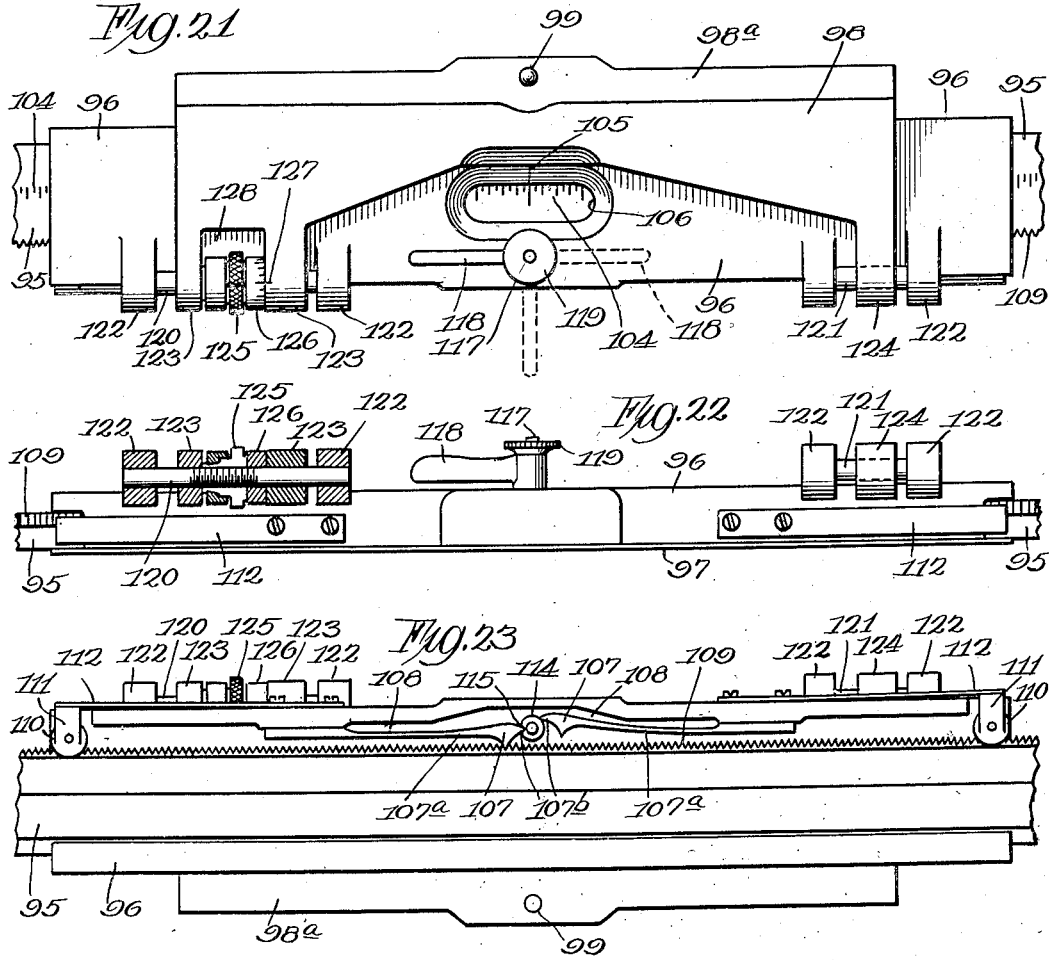
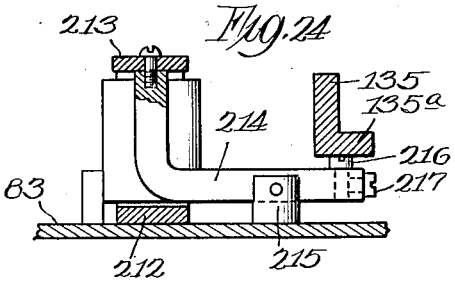
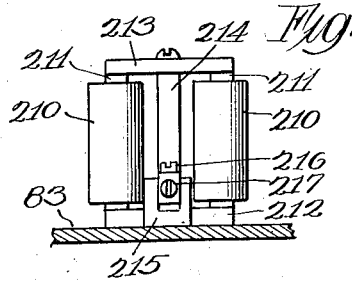
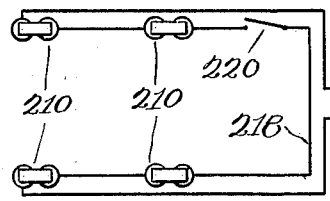
Inventor:
Alexander T. Koppe
By Rector, Hibben, Davis and Macauley
Attys.

Patented Sept. 4, 1928.

1,682,845

UNITED STATES PATENT OFFICE.

ALEXANDER T. KOPPE, OF CHICAGO, ILLINOIS, ASSIGNOR TO DIRECTOPLATE CORPORATION, OF CHICAGO, ILLINOIS, A CORPORATION OF ILLINOIS.

PHOTO-COMPOSING MACHINE.

Application filed January 21, 1925. Serial No. 3,788.

This invention relates to photo-composing machines adapted for use in making offset press plates and is an improvement on the form of machine disclosed in my prior Patent No. 1,510,007, granted September 30, 1924.

In the operation of a photo-composing machine of the type disclosed in the above mentioned patent, the subject to be reproduced in a subsequent printing operation is transferred by photographic means from a negative to a sensitized plate of zinc or the like, and a plurality of impressions of the subject-matter of the negative are commonly reproduced on a single zinc plate of relatively large size so that it is necessary, between successive exposures of the negative, to move the negative from one position to another over and above the surface of the zinc plate. For this purpose, means are commonly provided for moving the negative carrying frame toward and from the surface of the sensitized plate, in combination with means for moving the negative carrying frame longitudinally and transversely of the machine over the surface of the sensitized plate. The principal object of the present invention is to provide improved means for securing great accuracy in the positioning of the negative carrying frame with respect to the surface of the sensitized plate. A further object of the invention is to provide means for adjusting the negative carrying frame over the sensitized plate in combination with additional means for effecting a final precise adjustment of the position of the negative. Still another object is to provide means for moving the negative carrying frame upwardly from the sensitized plate in combination with additional means for holding the negative carrying frame in its upper position after the lifting means has been withdrawn therefrom, in order that certain mechanism cooperating with said lifting means may be operated to effect the final precise positioning of the negative carrying frame before the negative carrying frame is lowered toward the sensitized sheet. A further important object of the invention is to provide cam operated means for effecting the elevation of the negative carrying frame away from the sensitized sheet, in combination with electromagnetic means for independently holding the negative carrying frame in its elevated position after the support provided by the cam operated means has been withdrawn. Other objects relate to various features of construction and arrangement which will appear more fully hereinafter.

The nature of the invention will be understood from the following specification taken with the accompanying drawings in which one embodiment is illustrated. In the drawings, Fig. 1 shows a top plan view of the improved photo-composing machine; Fig. 2 shows a front elevation of the machine; Fig. 3 shows a transverse vertical section taken on the line 3—3 of Fig. 1; Fig. 4 shows an enlarged plan view of the negative carrying frame and adjacent parts of the carriage structure by which the negative is moved with respect to the zinc plate; Fig. 5 shows a detail sectional view taken on the line 5—5 of Fig. 4; Fig. 6 shows another detail sectional view taken on the line 6—6 of Fig. 4; Fig. 7 shows a detail sectional view taken on the line 7—7 of Fig. 4; Fig. 8 is a detail vertical section taken on the line 8—8 of Fig. 7; Fig. 9 is a detail sectional view taken on the line 9—9 of Fig. 8; Fig. 10 is a detail section taken on the line 10—10 of Fig. 7; Fig. 11 shows a horizontal sectional view taken on the line 11—11 of Fig. 10; Fig. 12 shows a detail vertical section taken on the line 12—12 of Fig. 11; Fig. 13 is a detail sectional view taken on the line 13—13 of Fig. 11; Fig. 14 is a detail sectional view taken on the line 14—14 of Fig. 11; Fig. 15 is a detail sectional view taken on the line 15—15 of Fig. 11; Fig. 16 is an enlarged vertical section taken on the line 16—16 of Fig. 1; Fig. 17 shows an enlarged front elevation of the dial employed in conjunction with the mechanism for effecting a seating movement of the negative supporting carriage with respect to the sensitized sheet; Fig. 18 shows an enlarged detail section taken on the line 18—18 of Fig. 16; Fig. 19 shows an enlarged and elevation of a portion of the machine, illustrating the mechanism of Fig. 16 by which the movements of the negative supporting carriage are controlled and by which the electro-magnetic holding means for the negative frame are controlled; Fig. 20 is a perspective view of the switch operating plate embodied in the construction illustrated in Fig. 19; Fig. 21 shows an enlarged top plan view of one of the negative positioning blocks by which the negative frame is positioned transversely of the machine; Fig. 22 shows a side elevation of the mechanism illustrated in Fig. 21, parts thereof being shown in section transversely of the machine; Fig. 23 shows a bottom plan view of the mechanism illustrated in Fig. 21; Fig. 24 shows a detail sectional view taken on the line 24—24 of Fig. 1, showing the construction of one of the electro-magnetic-lifting devices; Fig. 25 shows a front elevation of the electro-magnetic device illustrated in Fig. 24; and Fig. 26 shows a diagrammatic view of the circuit connections of the electro-magnetic holding devices.

As illustrated in the drawings, the machine comprises a frame 30 in the form of a rectangular structure having front and rear longitudinal frame members 31 connected by transverse end frame members 32. This frame is supported on legs 33 which may be connected by reinforcing members 34. The frame 30 carries a bedplate 35 which extends longitudinally between the end frame members 32 and has mounted thereon a flexible and slightly compressible rubber sheet or blanket 36 adapted to form a support for the sensitized zinc plate 37 on which the impression of the negative is reproduced by photographic means. The rubber blanket 36 is secured at one end 38 to the bedplate 35 and at the other side it extends downwardly over the edge of the bedplate and is secured to a roller 40 which is mounted in bearings carried by the frame members 32 and which carries a worm gear 41 adapted to be driven by a worm 42 mounted on a shaft 43 extending outwardly through the front frame member 31 of the machine to be engaged by a hand crank, as shown in Fig. 3. The operation of the hand crank on the shaft 43 serves to turn the roller 40 so that the rubber blanket 36 is tightened and caused to engage closely the upper surface of the bedplate. One edge of the sensitized press plate 37 is clamped between a clamping plate 45 and a clamping plate 46 which are mounted on a stationary bar 47 extending throughout the length of the machine. The plates 45 and 46 are connected by screws 48 which may be tightened to cause the plates to grip the edge of the blanket, and other screws 49 passing through the plate 46 and engaging the upper surface of the plate 45 serve as fulcrums to give a tilting action to the upper plate 46. The opposite edge of the sensitized press plate 37 is received and held by a clamp 50 carried by the adjustable block 51 which has a sliding connection 52 with the edge of the bedplate 35, as shown in Fig. 3. Adjusting screws 53 engage the slot or block 51 and cooperate with the edge of the bedplate 35 so that when the screws are adjusted they operate to draw the sensitized sheet taut over the surface of the rubber blanket.

The negative 55 bearing an impression which is to be reproduced on the sensitized zinc plate 37, is mounted in a negative frame 56 in which it is held by clamping plates 57 and adjusting screws 58, as shown in Fig. 4. The negative frame 56 is in turn carried by a vacuum frame 60 having an annular inwardly projecting flange 61 adapted to receive the overlying outwardly extending flange of the negative frame, as shown in Fig. 5. The negative frame is positioned on the vacuum frame by means of pins 62 extending upwardly from the flanges 61 and engaging apertures in the outer flanges of the negative frame on opposite sides thereof. The under side of the vacuum frame 60 is recessed upwardly around its outer edge as shown at 64 to receive an annular sealing ring 65 of rubber or other compressible material which is secured in position against an inner air channel member 66 by means of a plurality of metal clips 67 attached to the outer surface of the vacuum frame by screws 68, as shown in Fig. 6. When the vacuum frame 60 is lowered, the lower sealing ring 65 engages the upper surface of the sensitized plate 37 to form an air-tight seal around the lateral edges of the vacuum frame and the passage of air through the spaces around the negative and around the negative frame is prevented by an upper annular sealing ring 70 of rectangular form which rests on the upper surfaces of the negative and vacuum frame, as shown in Fig. 5. When suitable suction means is connected to a pipe 71 leading downwardly through the vacuum frame 60 and communicating with the channel member 66, the air between the negative and the sensitized sheet is drawn into the member 66 through the annular slot 66ª thereof and exhausted through the pipe 71, so that a vacuum is produced between the negative and the sensitized sheet with the result that the negative is forced by atmospheric pressure into close contact with the sensitized sheet, thus producing a close contact adapted for the reproduction of the impression of the negative on the sensitized plate when the negative is exposed to a suitable source of light, not shown, mounted above the machine.

In order that a vacuum may be obtained and exposures conveniently made when the vacuum frame 60 is projected beyond the edges of the bedplate at the front and rear sides of the machine, auxiliary sealing plates 75 are provided, these plates being mounted on blocks 76 which are journaled in bearings carried by the end frame members 32 so that they may be tilted upwardly when desired. The edges of the rubber blanket 36 and of the sensitized plate 37 are carried downwardly over the edges of the bedplate and the inner edges of the sealing plates 75 are adapted to contact with the downwardly inclined portions of the sensitized sheet at the edge of the bedplate so that the upper surface of each sealing plate 75 lies substantially flush with the upper surface of the sensitized plate 37, thereby permitting the vacuum frame 60 to extend over the edge of the bedplate and the edge of the sensitized sheet without destroying the vacuum.

During the time that the negative is being moved from one position to another over the surface of the sensitized plate 37, the vacuum frame 60 is supported in an elevated position out of contact with the sensitized plate by a carriage 80 which is adapted to travel longitudinally of the bedplate carried by the frame 30. The carriage 80 comprises front and rear carriage frames 81 each consisting of a central carriage block 82 and two side carriage blocks 83 which are connected by a plate 84. The plate 84 of each carriage frame is pivotally connected to the central block 82 by a pin 85 and each plate 84 is connected to each of the end carriage blocks 83 by means of a bolt 86 engaging one of a plurality of slots 87 which are provided in each end of the plate, and having a hand nut 86ᵃ on the outer end thereof, as shown in Fig. 2, so that the spaced relation of the carriage blocks 83 at each side of the machine may be varied to accommodate the carriage 80 to vacuum frames of different widths. At the front and rear sides of the machine, the longitudinal frame members 31 are each provided with a longitudinal V-shaped groove 88 forming a V-shaped rib 89 and another rib 90 having an inclined surface 91 which provides a trackway extending longitudinally of the machine to coact with the inclined face of a lug 92 formed on each of the middle carriage blocks 82 of the front and rear carriage frames 81. A flange 93 extends downwardly on the front side of the trackway 91, as shown in Fig. 10. The carriage blocks 83 are each provided with rollers 93 and the V-shaped ribs 89 serve as the trackways adapted to coact with the rollers 93 having grooved peripheral surfaces adapted to conform to the contour of the rib 89, as shown in Fig. 8. The front and rear carriage frames 81 are connected by transverse register bars 95 having the form shown in Fig. 5. Each register bar 95 is slidably engaged by a register block 96 having an undercut groove, engaged by the overhanging edge of the bar 95, and provided at the other side thereof with an underlying plate 97 which projects beneath the bar 95. Each register block 96 carries a relatively adjustable positioning block 98 provided along its inner lower edge with an inwardly projecting flange 98ᵃ adapted to underlie one of the outwardly projecting flanges 60ᵃ which are formed along opposite sides of the vacuum frame 60. The flange 98ᵃ of one of the positioning blocks 98 is provided with an upwardly extending pin 99 adapted to engage an aperture 100 which is formed in the flange 60ᵃ of the vacuum frame, and at the other side of the vacuum frame, there are provided a pair of spaced lugs 101 on the upper surface of the positioning block 98, adapted to receive between them a lug or pin 102 which projects laterally from the adjacent edge of the vacuum frame. In this way, the vacuum frame 60 is positioned definitely with respect to the positioning blocks 98 carried by the opposite carriage bars 95.

Each bar 95 is provided on its upper surface with a series of graduations 104 extending substantially throughout the length of the bar and the positions of the register blocks are indicated by graduations or index marks 105 located on the upper surfaces of the register blocks 96, as shown in Fig. 21. The graduations 104 are visible through apertures 106 which are formed in the top surfaces of each of the register blocks 96 so that in positioning the vacuum frame transversely of the machine, the blocks 96 are moved manually on the bars 95 until they reach the proper positions as indicated by the registration of the index marks 105 with the desired graduation marks 104. The register blocks are held in the desired adjusted position by means of detents 107, two of which are provided for each register block, as shown in Fig. 23. These detents are mounted on springs 107ᵃ and are located in the recesses 108 above the plates 97. Each bar 95 is provided along the upper part of its outer edge with a series of teeth 109 adapted to be engaged by the detents 107 and, beneath the rack teeth 109, each bar 95 has a smooth surface adapted to be engaged by rollers 110 which are mounted in brackets 111 arranged to be moved inwardly by leaf springs 112, so that the register blocks 96 are maintained at all times in close contact with the inner edges of the bars 95. The detents 107 are moved out of engagement with the teeth 109 of each bar 95 by means of a cam 114 having formed in the surface thereof a notch 115 adapted to be engaged by the extremities 107ᵇ of the detents. Each cam 114 is mounted on a pin 117 extending upwardly through the register block 96 and having keyed on the upper end thereof an operating arm 118. The upper end of each pin 117 is threaded to be engaged by a locking member 119 so that after the arm 118 has been turned to move the cam 114 to the desired position, the locking member 119 may be operated to secure the cam in that position. When the cam 114 is rotated, the notch 115 therein engages one or the other of the detents 107. Two of the detents are provided so that they may be moved into engagement with the teeth 109 alternately to engage alternate teeth corresponding to one-sixteenth inch graduations on the bar.

Each positioning block 98 is pivotally mounted on its supporting register block 96, the connection being made by means of pins 120 and 121 which are fixed in the ears 122 carried by the register block 96 and which are pivotally engaged by other ears 123 and 124 carried by the positioning block 98. Each of the pins 120 is threaded throughout a portion of its length to be engaged by a micrometer screw 125 provided with a dial 126 having graduations which may be brought into register with an index mark 127 formed on the ear 123. The ear 123 is notched as shown at 128 and the micrometer screw with its dial is located in this notch so that when it is rotated on the screw-threaded pin 120, its engagement with the opposite parts of the ear 123 forces the positioning block 98 in one direction or the other. This micrometer adjustment may be used to compensate for inaccuracies due to the stretching of the zinc plate after a part of a design of several colors has been printed, for example, or for other purposes where a fine adjustment is desired. After the adjustment has been made, the locking members 119 may be tightened to secure the positioning block 98 in the desired adjusted position with respect to the supporting register block 96.

To prevent the register bars 95 from sagging, the carriage 80 is provided with two tubular reinforcing bars 130 which are fixed in brackets 131 secured to the ends of the bars 95. The register blocks 96 are provided at each end with other brackets 132 which are adapted to slide on the tubular bars 130 when the register blocks are adjusted transversely of the machine.

The carriage 80 also comprises a pair of lifting bars 135, each of which is of angle bar form, having an inwardly directed horizontal flange 135ᵃ. At their ends, the flanges 135ᵃ are cut away so that the extremities 135ᵇ of the lifting bars are permitted to engage notches 136 extending downwardly from the top surfaces of supporting posts 137 which are mounted in fixed positions on the side blocks 83 of the carriage 80 at the front and rear sides of the machine. The lifting bars are adapted to slide upwardly in the notches 136, without disengagement from the posts 137, for the purpose of elevating the vacuum frame 60 when it is desired to move the vacuum frame and the negative with respect to the surface of the sensitized plate 37. For this purpose, the vacuum frame 60 is provided on each side with a pair of lifting hooks 138 having pivotal movement about vertical axes and having their upper ends extended horizontally and provided with rollers 138ᵃ which may be turned to project over the flanges 135ᵃ of the lifting bars, as shown in Fig. 6, for the purpose of permitting the vacuum frame 60 to be elevated when the lifting bars 135 are elevated by the mechanism hereinafter described. When it is desired to remove the vacuum frame 60 from the carriage 80, the heads 138ᵃ of the lifting hooks may be turned inwardly out of engagement with the lifting bars, and then the lifting bars, which normally overlie the edges of the vacuum frame, as shown in Fig. 6, may be lifted upwardly out of engagement with the posts 137 and removed from the machine, to permit the vacuum frame 60 to be elevated and removed from the carriage.

Before describing the mechanism by which the lifting bars 135 are elevated and held in their elevated positions, the means for moving the carriage 80 longitudinally of the machine will be explained. The front and rear frame members 31 of the machine have journaled therein two transverse shafts 140 and 141 which are located inwardly from the end frame members 32, as shown in Fig. 1. The shaft 140 has fixed thereon two sprocket gears 142 located at the front and rear sides of the machine to be engaged by endless sprocket chains 143. The sprocket chain 143 at the rear side of the machine extends around another sprocket gear 144 rotatably mounted on the rear end of the shaft 141 and the sprocket chain 143 at the front side of the machine extends around a sprocket gear 144 which is rotatably mounted on the forward end of the shaft 141. The forward end of the shaft 140 is provided with a squared portion 140ᵃ adapted to be engaged by a crank 145 and the chains 143 are connected to the center blocks 82 of the carriage frames, as shown at 146, so that when the shaft 141 is rotated by the crank 145, the movement of the chains serves to effect a movement of the carriage 80. The operation of the crank on the shaft 140 is utilized only for moving the carriage 80 toward the left as viewed in Figs. 1 and 2 and the feeding movement of the carriage toward the right is brought about by certain mechanism operated by the shaft 141. The shaft 141 is operated by a lever 147 which is keyed on the outer end of the shaft. A dial 148 and a ratchet wheel 149 are supported by and mounted for rotation on a sleeve 150 which is keyed in stationary positon with respect to a fixed bracket 151 and which is rotatably engaged by the shaft 141. The dial and the ratchet wheel are separated by a flange 152 which is formed on the sleeve 150, and the ratchet wheel is retained in position on the outer end of the sleeve by means of a plate 153 secured to the end of the sleeve, as shown in Fig. 18. The motion of the crank or lever 147 is transmitted to the ratchet wheel 149 by a pawl 154 which is fixed on the lever, as shown in Fig. 17. The reverse rotation of the ratchet wheel is normally prevented by another pawl or detent 155 mounted on the dial 148 which is normally locked against rotation on the sleeve 150 by a clutch member 156 formed on the dial and engaging the clutch member 157 formed in the fixed bracket 151. These clutch members are forced into and out of engagement with each other by a locking lever 158 which is threaded on the sleeve 150 on the inner side of the bracket 151 and on the inner side of a frame member 159 which carries the longitudinal scale 160 by means of which the longitudinal position of the carriage 80 is determined. The carriage 80 is provided with a pointer 161 adapted to move in proximity to the scale 160 and before the carriage 80 is adjusted longitudinally of the machine, the locking lever 158 is operated to release the clutch members 156 and 157, and the dial 148 is then rotated until the desired graduation thereon is brought into position opposite the graduation on the stationary stop 163 which is carried by the lower end of the bracket 151, this setting of the dial having been predetermined by reference to the scale 160 and the pointer 161. The locking lever 158 is then operated to lock the dial 148 in adjusted position and the stop 165 adjacent the zero graduation on the dial 148 will then be located properly to limit the throw of the crank or lever 147 at a point corresponding to the limit of desired movement of the ratchet wheel 149 and the carriage 80.

The rotation of the shaft 141 by the operation of the crank 147 serves to effect a longitudinal movement of the carriage 80, toward the right as viewed in Figs. 1 and 2, through the operation of pinions 170 which are keyed on the shaft 141 at the front and rear ends thereof and which mesh with rack bars 171 mounted for movement longitudinally of the frame 30 and having connection with the carriage 80, as hereinafter described. The front and rear frame members 31 of the machine are provided on their inner sides with shoulders 172 extending the full length thereof and having V-shaped longitudinal grooves 173 formed therein, as shown, for example, in Fig. 18. Each rack bar 171 is provided on its inner side with a V-shaped projection adapted to engage one of the V-shaped grooves 173, while on its upper side each rack bar is provided with ratchet teeth 171$^b$ located opposite the rack teeth 171$^a$ which mesh with the pinions 170. The rack bars 171 are held in sliding engagement with the grooves 173 by means of spring plates 174 secured to the frame members 31 by means of bolts 175, as shown particularly in Fig. 8. Each middle block 82 of the carriage 80 is provided with two pivotally mounted pawls 177 which are normally pressed into engagement with the ratchet teeth 171$^b$ by means of leaf springs 178. The teeth 171$^b$ are spaced apart to correspond to the spacing of the graduations on the face of the dial 148 and one pawl 177 of each pair is of greater length than the other, so that the extent to which the carriage 80 is moved depends upon which pawl 177 of each pair is in engagement with the ratchet teeth of the adjacent rack bar 171 when the rack bar is moved by the operation of the crank 147. The pawls 177 are moved into and out of engagement with the ratchet teeth 171$^b$ of the rack bars 171 by means of cams 180 fixed on the shafts 181 which extend longitudinally of the machine at the front and rear sides thereof within the frame members 31. The cam shafts 181 are actuated at each end thereof by transverse shafts 182 which are connected thereto at the right hand end of the machine, as viewed in Fig. 1, by bevel gears 183 and at the left hand end of the machine by worms 184$^a$ and worm wheels 184$^b$. The shafts 182 are operated by a crank or lever 185 fixed on a longitudinal shaft 186 which has a worm wheel 187 keyed thereon near one end to mesh with a worm 188 fixed on the adjacent shaft 182 while the other end of the shaft 186 is connected to the other shaft 182 by bevel gears 186$^a$. The cam shafts 181 are thus driven at both ends, thereby eliminating any possibility of their twisting under torsional stress. The position of the lever 185 is indicated by a stationary quadrant 189 having thereon a series of teeth or markers 190$^a$, 190$^b$, 190$^c$, 190$^d$, and 190$^e$ adapted to be engaged by a latch 189$^a$ carried by the lever. When the lever 185 is moved angularly from the neutral position 190$^c$, the two shafts 181 are rotated to actuate the cams 180 by which the positions of the pawls 177 are controlled. When the detents are elevated against the pressure of the springs 178, as illustrated in Fig. 12, the teeth of the pawls 177 are released from the ratchet teeth 171$^b$ on the rack bars 171, so that the carriage 80 may then be moved toward the left, as viewed in Fig. 1 by the operation of the crank 145.

The shafts 181 also control the operation of certain detent mechanism which is provided for locking the carriage 80 in position after it has been shifted. This mechanism comprises a pair of longitudinally extending toothed bars 191 one of which is mounted on the inner side of each of the longitudinal frame members 31. These toothed bars have accurately machined teeth which are adapted to be engaged by detents 192, two of which are mounted on each center block 82 of the carriage 80, the detents being carried at the ends of leaf springs 193 which are secured to the carriage blocks and which normally hold the detents out of engagement with the toothed bars. The detents 192 are actuated to engage the toothed bars by cams 194 which are fixed on the shafts 181 adjacent the cams 180. For convenience of adjustment, the two cams 194 at each side of the machine are mounted on a sleeve 195 which is fixed on the adjacent shaft 181 and which has an annular projection 195$^a$ at its middle point, the opposite inclined surfaces of which are engaged by the cams 194 which are secured in adjusted position by lock nuts 196, each cam 180 being secured in position between two of these lock nuts, as shown in Fig. 12. Two of the detents 192 are provided for each shaft 181 so that one detent of each pair will engage the adjacent toothed bar 191, depending upon the position of the lever 185 by which the angular positions of the shafts 181 are controlled. The teeth of the detents 192 are so arranged that one of them will engage the adjacent toothed bar 191 at either a one-sixteenth or a one-eighth inch movement of the carriage 80, to correspond with the action of the pawls 177 by which the feeding movement of the carriage is effected through the motion of the rack bars 171.

The angular movement of the shafts 181, effected by the actuation of the lever 185, is also utilized to elevate the lifting bars 135 of the carriage 80. This lifting movement is effected by means of four cams 198, one of which is splined on one of the shafts 181 beneath each of the side carriage blocks 83 of the carriage 80. These cams are engaged on their peripheral surfaces by rollers 199 mounted at the lower ends of plungers 200 which are slidably mounted in the carriage blocks 83 and which carry at their upper ends enlarged heads 201 arranged to underlie the ends of the lifting bars 135, as indicated in Fig. 8. For the purpose of maintaining the plungers 200 normally in contact with the surfaces of the bars 135, coil springs 202 may preferably be mounted on the plungers 200 between the upper sides of the carriage blocks 83 and the heads 201. The cams 198 are mounted to move longitudinally of the shafts 181 when the carriage 80 is shifted, this movement of the cams being effected by their connection with collars 203 which are rotatably engaged by the shafts 181 and which are provided with annular grooves 204 adapted to receive the ends of pins 205 which are slidably mounted in the carriage blocks 83 and which are normally moved into engagement with the grooves 204 by means of coil springs 206, as shown particularly in Fig. 7. The pins 205 have heads 207 which permit them to be withdrawn when desired. When all of the cams 198 are simultaneously actuated by the turning of the shafts 181, the lifting bars 135 of the carriage 80 are elevated and the vacuum frame 60 is raised until all parts of the vacuum frame and parts carried thereby are out of engagement with the surface of the sensitized plate 37, thereby permitting the carriage 80 to be shifted from one position to another and permitting the vacuum frame to be shifted in its position on the carriage without causing injury to the surface of the sensitized plate. During the shifting movement of the vacuum frame 60 either on the bars 135 of the carriage 80 or by reason of the shifting movement of the carriage 80 on the supporting frame, the weight of the vacuum frame 60 is supported by the detachable lifting bars 135. When the lifting bars 135 are elevated by the cams they remain in engagement with the posts 137 and the vacuum frame 60 retains its connection with the positioning blocks 98, because of the length of the pin 99 and the lugs 101. Hence, the vacuum frame and the register blocks 96 move together during the adjustment of the vacuum frame transversely of the machine at which time the vacuum frame is supported by the hooks 138 having rollers 138$^a$ which travel on the lifting bars 135.

When the lever 185 is in the neutral position opposite the marker 190$^c$ on the quadrant 189, in which position the lever is illustrated in Fig. 19, the longitudinal shafts 181 are in such positions that the lifting bars 135 are elevated by the cams 198, the carriage locking detents 192 are out of engagement with the toothed bars 191, and the pawls 177 are out of engagement with the ratchet teeth on the rack bars 171, so that the carriage 80 can be returned to the starting point at the left-hand end of the machine, as view in Fig. 1, by means of the crank 145 mounted on the outer end of the shaft 140. When the lever 185 is moved to either of the intermediate positions, indicated by the markers 190$^b$ and 190$^d$ on the quadrant 189 illustrated in Fig. 19, the carriage feeding pawls 177 are moved into engagement with the ratchet teeth of the rack bars 171, but the carriage locking detents 192 are still held out of engagement with the toothed bars 191, and the cams 198 are still in such positions that they hold the lifting bars 135 in their raised positions, so that, with the lever 185 in either of the intermediate positions referred to, the carriage 80 can be given a feeding movement toward the right, as viewed in Fig. 1, by the actuation of the lever 147. The feeding movement of the carriage 80 takes place through a predetermined distance according to the previous setting of the dial 148 and its stop 165. When the carriage 80 has been shifted to the predetermined position, a full throw of the lever 185 to one of the extreme positions 190$^a$ or 190$^e$ will cause one of the detents 192 to engage certain notches of the toothed bars 191, thereby locking the carriage 80 positively at a certain graduation depending upon the previous setting of the dial, the position of the lever 185 opposite the pointer 190$^a$ corresponding to a one-eighth inch graduation on the dial and the position 190$^e$ corresponding to a one-sixteenth inch setting on the dial. The angular movement of the shafts 181 by turning the lever 185 to either of the positions indicated by the pointers 190$^a$ or 190$^e$, also operates to turn the cams 198 so that the lifting bars 135 are free to move downwardly by gravity and thereby permit the vacuum frame 60 to lower. However, the lifting bars 135 are maintained in their elevated positions for a brief interval after the lever 185 has been operated to move the detents 192 into engagement with the toothed bars 191, by means of the electro-magnetic devices hereinafter described. This maintenance of the lifting bars 135 in their elevated positions by the electro-magnetic devices permits the detents 192 to effect a precise positioning of the carriage 80 as the teeth of the detents 192 engage the accurately machined toothed bars 191, the setting of the carriage through the operation of the crank 147 being only approximately accurate.

The lifting bars 135 are therefore held in their elevated positions in order to hold the vacuum frame 60 and parts carried thereby out of engagement with the sensitized sheet 37 for a sufficient period of time to permit the detents 192 to engage the toothed bars 191 and thereby effect a slight final adjustment of the carriage 80 without causing injury to the sensitized plate. The electro-magnetic mechanism for holding the lifting bars 135 in their elevated positions comprises a pair of electro-magnets 210 mounted at each end of each of the lifting bars 135. The magnets 210 of each pair are mounted on the magnetizable arms 211 of a yoke-shaped core 212 which is secured on the upper surface of one of the carriage blocks 83. Each pair of electro-magnets is provided with an armature 213 mounted on an angular lever 214 and adapted to engage the extremities of the core members 211. The armature levers 214 are pivoted on supporting brackets 215 and their outer ends are provided with vertically adjustable contact screws 216 adapted to engage the under sides of the lifting bars 135. The contact screws 216 are secured in adjusted position by set screws 217. The electro-magnets 210 are connected in series in an electric circuit 218, as shown in Fig. 26, and the insulated wires of the electric circuit at one side of the machine are carried through the tubular reinforcing members 130 of the carriage 80, as shown in Fig. 4, so that the connections to the magnets are all carried downwardly at the rear side of the machine. The circuit 218 is connected to a suitable source of electrical energy and the actuation of the magnets 210 is controlled by a switch 220 mounted in a casing 221.

The switch 220 is operated by a lever 223 which serves also to control the connection of the air exhaust line to the vacuum frame. The lever 223 is mounted on a shaft 224 which is journaled in bearings carried by the end frame members 32 and a bracket 225 secured to the end frame members, as shown in Fig. 16. The inner end of the shaft 224 is connected to operate a valve 226 which is connected in the suction line 227 leading to the vacuum frame 60. A pinion 228 is fixed on the shaft 224 between its bearings and this pinion meshes with rack teeth 229 formed on the lower edge of a switch operating plate 230 which is pivotally connected at 231 to a link 232 having a pivotal connection at 233 with the handle 234 of the switch 220. The plate 230 is provided on its inner side with an overhanging shoulder 235 adapted to slide on a flange 236 which is formed on a bracket 237 secured to the end frame of the machine. On its front side, the plate 230 is provided with a ledge 238 above which is located a plate 239 secured to the bracket 237 above the plate 230 by cap screws 240, thereby holding the sliding plate 230 in position on the bracket 237. The movement of the plate 230 toward the right, as viewed in Fig. 19, is limited by a stop pin 241 projecting outwardly from the bracket. The plate 230 is further provided with an upwardly extending arm 242 which, when the lever 223 is in the vertical position, illustrated in Fig. 19, is adapted to extend upwardly at one side of the longitudinal axis of the operating lever 185 when this lever is also in the vertical position. When the lever 223 is in the vertical position, the switch 220 is closed so that the magnets 210 are energized to hold the lifting bars 135 in their elevated positions, and with the lever 185 also in the vertical position, illustrated in Fig. 19, corresponding to the position of the pointer $190^c$ on the quadrant 189, the operator cannot move the lever 223 to open the switch 220 because of the interference of the projection 244 on the hub of the lever 185 with the upstanding arm 242 on the plate 230. When the lever 185 is in either of the intermediate positions $190^b$ or $190^d$, the projection 244 on the lower end of the lever also prevents the actuation of the lever 223 to open the switch 220, so that it is only after the lever 185 has been shifted to either of the extreme positions $190^a$ or $190^e$ that the lever 223 may be operated to open the switch 220 and thereby release the lifting bars 135 from the magnets 210. When the lever 185 is in either of the extreme positions, the arm 242 on the plate 230 is permitted to pass beneath one of the inclined faces 245 on the hub, one of which is located on either side of the projection 244, so that the operator may then move the lever 223 to open the switch 220 and simultaneously connect the air exhausting means with the vacuum frame, so that the vacuum frame 60 is permitted to lower by gravity into contact with the sensitized plate 37, simultaneously with the actuation of the suction means so that when the vacuum frame engages the sensitized plate, a vacuum is at once created in the region between the vacuum frame and the negative on the one hand, and the sensitized plate on the other, whereby the negative and the sensitized plate are drawn into close contact with each other in readiness for the exposure which is effected by the illuminating means located above the vacuum frame. In this way, the operation of the lever 185 to effect a precise positioning of the carriage 80 by the engagement of detents 192 with the toothed bars 191 is insured before the operation of the lever 223 takes place to permit the vacuum frame and the negative to lower by gravity toward the sensitized plate. After the lifting bars 135 and the vacuum frame 60 have been elevated by operation of the lever 185, the operator may actuate the lever 223 to close the switch 220 and energize the electro-magnets so that the maintenance of the lifting bars 135 in their upper position is insured before the lever 185 is again operated to turn the cam shafts 181 into the positions which subsequently permit the lifting bars to be lowered when the magnets are de-energized.

Although one form of the invention has been shown and described by way of illustration, it will be understood that it may be constructed in various other embodiments within the scope of the appended claims.

I claim:

1. The combination in a photo-composing machine, of a negative holding frame, means for raising said frame and holding it in an elevated position, means for operating said raising means to release said frame, and additional means for holding said frame in said elevated position after it has been released by said raising means.

2. The combination in a photo-composing machine, of a negative carrying frame, means for raising said frame and holding it in an elevated position, means for operating said raising means to release said frame, and electro-magnetic means for holding said frame in an elevated position after it has been released by said raising means.

3. The combination in a photo-composing machine, of a bedplate for supporting a sensitized plate, a negative carrying frame, means for raising said negative carrying frame away from said bedplate, means for rendering said raising means inoperative to hold said frame in its elevated position, and means operative for holding said negative carrying frame in an elevated position after said raising means has been rendered inoperative.

4. The combination in a photo-composing machine, of means for supporting a sensitized plate, a negative carrying frame, a member adapted to elevate said negative carrying frame, means adapted to engage said member to elevate said frame, means for operating said elevating means to release said carrying frame in its elevated position, and additional means acting on said member to hold said negative carrying frame in an elevated position after said member has been released by said elevating means.

5. The combination in a photo-composing machine, of means for supporting a sensitized plate, a negative carrying frame, means for elevating said negative carrying frame, means for moving said negative carrying frame over the surface of said sensitized plate after it has been elevated therefrom, cooperating means for releasing said elevating means and positioning said negative carrying frame with respect to said sensitized plate, and means operative while said positioning means is in operation for holding said negative carrying frame in an elevated position.

6. The combination in a photo-composing machine, of means for supporting a sensitized plate, a negative carrying frame, means for elevating said negative carrying frame, means for moving said negative carrying frame over the surface of said sensitized plate after it has been elevated therefrom, cooperating means for releasing said elevating means and positioning said negative carrying frame with respect to said sensitized plate, and electro-magnetic means cooperating with a part of said elevating means for holding said negative carrying frame in an elevated position while said positioning means is operative.

7. The combination in a photo-composing machine, of means for supporting a sensitized plate, a negative carrying frame, a member for supporting said negative carrying frame, cam operated means for actuating said member to raise said negative carrying frame away from said sensitized plate, means for adjusting said negative carrying frame parallel to the surface of said sensitized plate while said negative carrying frame is elevated, means for releasing said cam-operating means and effecting a positioning of said negative carrying frame after it has been moved, and means cooperating with said member while said positioning means is operative for holding said negative carrying frame in an elevated position.

8. The combination in a photo-composing machine, of means for supporting a sensitized plate, a negative, supporting means for said negative, suction operated means for securing a close contact between said negative and said sensitized plate, means for holding said negative supporting means in an elevated position, and means for releasing said holding means and rendering said suction operated means operative.

9. The combination in a photo-composing machine, of means for supporting a sensitized plate, a negative, supporting means for said negative, suction operated means for securing a close contact between said negative and said sensitized plate, means for holding said negative supporting means in an elevated position, and means for releasing said holding means to permit said supporting means to lower toward said sensitized plate and simultaneously to actuate said suction operated means to secure contact between said sensitized plate and said negative.

10. The combination in a photo-composing machine, of means for supporting a sensitized plate, a negative, a frame for carrying said negative, means for securing a close contact between said negative and said plate, means for elevating said negative from said plate, means for moving said negative carrying frame parallel to the surface of said sensitized plate while it is elevated, means for positioning said negative carrying frame after it has been moved, additional means for holding said negative carrying frame in an elevated position while said positioning means is operative, and means for releasing said holding means and actuating said contact securing means.

11. The combination of a photo-composing machine, of means for supporting a sensitized plate, a negative, a frame for carrying said negative and said plate, means for securing a close contact between said negative and said plate, means for elevating said negative from said plate, means for moving said negative carrying frame parallel to the surface of said sensitized plate while it is elevated, means for positioning said negative carrying frame after it has been moved, additional means for holding said negative carrying frame in an elevated position while said positioning means is operative, and means actuated by a single operating member for releasing said additional holding means and simultaneously actuating said contact securing means.

12. The combination in a photo-composing machine, of means for supporting a sensitized plate, a negative carrying frame, means comprising a pair of lifting bars for elevating said frame, cam operated means for elevating said lifting bars, and additional means cooperating with said lifting bars for holding them in an elevated position after they have been released by said cam operated means.

13. The combination in a photo-composing machine, of means for supporting a sensitized plate, a negative carrying frame, means for moving said frame away from said plate, means for moving said frame parallel to the surface of said plate, means for positioning said negative carrying frame after said last named movement, and means for preventing the return of said negative carrying frame toward said sensitized plate while said positioning means is in operation.

14. The combination in a photo-composing machine, of means for supporting a sensitized plate, a negative carrying frame, means comprising a lifting bar for elevating said frame, means for elevating said lifting bar, and electro-magnetic means having a part engaging said lifting bar for holding it in its elevated position after it has been released by said last named means.

15. The combination in a photo-composing machine, of means for supporting a sensitized plate, a negative carrying frame, means comprising a pair of lifting bars for elevating said frame, cam operated means engaging each end of each lifting bar for elevating said lifting bars away from said sensitized plate, and additional means engaging each end of each of said lifting bars for holding them in their elevated positions after they have been released by said cam operated means.

16. The combination in a photo-composing machine, of means for supporting a sensitized plate, a negative carrying frame, means comprising a pair of lifting bars for elevating said frame, cam operated means engaging each end of each lifting bar for elevating said lifting bars away from said sensitized plate, and electromagnets having armatures extending beneath said lifting bars and adapted to hold said bars in their elevated positions when said electro-magnets are energized.

17. The combination in a photo-composing machine, of means for supporting a sensitized plate, a negative carrying frame, electrically actuated means for holding said negative carrying frame away from said sensitized plate, suction operated means for securing contact between the negative and said sensitized plate, means for actuating said electrically operated means, and means for actuating said suction operated means.

18. The combination in a photo-composing machine, of means for supporting a sensitized plate, a frame carrying a negative, means for securing close contact between said negative and said sensitized plate, electrically actuated means for holding said negative carrying frame in a position removed from said sensitized plate, and means for simultaneously actuating said holding means to release said negative carrying frame and actuating said contact securing means to secure said close contact.

19. The combination in a photo-composing machine, of means for supporting a sensitized plate, a negative, suction operated means for securing close contact between said negative and said sensitized plate, a valve for controlling said suction operated means, electrically actuated means for holding said negative out of contact with said sensitized plate, a switch for controlling said electrically actuated means, and a common operating member for controlling the actuation of said valve and said switch.

20. The combination in a photo-composing machine, of means for supporting a sensitized plate, a negative carrying frame, means for elevating said negative carrying frame from said sensitized plate, a lever for operating said elevating means, means for moving said negative carrying frame parallel to the surface of said sensitized plate, means actuated when said lever is operated to release the support of said negative carrying frame by said elevating means for effecting a final positioning of said negative carrying frame after it has been moved parallel to said sensitized plate, additional means for holding said negative carrying frame in an elevated position while said positioning means is in operation, a lever for controlling the operation of said additional means, and means for causing the operation of one of said levers to be controlled by the actuation of the other of said levers.

21. The combination in a photo-composing machine, of means for supporting a sensitized plate, a negative carrying frame, means for elevating said negative carrying frame from said sensitized plate, a lever for operating said elevating means, means for moving said negative carrying frame parallel to the surface of said sensitized plate, means actuated when said lever is operated to release the support of said negative carrying frame by said elevating means for effecting a final positioning of said negative carrying frame after it has been moved parallel to said sensitized plate, additional means for holding said negative carrying frame in an elevated position while said positioning means is in operation, a lever for controlling the operation of said additional means, and means for preventing the actuation of said last named lever to permit said negative carrying frame to move toward said sensitized plate until said first named lever has been actuated to effect the operation of said positioning means.

22. The combination in a photo-composing machine, of means for supporting a sensitized plate, a negative carrying frame, means for positioning said negative carrying frame with respect to said sensitized plate, means for holding said negative carrying frame away from said sensitized plate while said positioning means is in operation, means for releasing said holding means, and means for preventing the actuation of said releasing means until said positioning means has been operated.

23. The combination in a photo-composing machine, of means for supporting a sensitized plate, a negative carrying frame, means for positioning said negative carrying frame with respect to said sensitized plate, means comprising a lever for operating said positioning means, means for holding said negative carrying frame away from said sensitized plate while said positioning means is in operation, means comprising a lever for controlling the operation of said holding means, an intermediate member adapted to be actuated by the movement of said last named lever to effect the release of said negative carrying frame by said holding means, and means lying normally in the path of movement of said intermediate member and arranged to permit the actuation of said intermediate member by said second named lever after said first named lever has been actuated to operate said positioning means.

24. The combination in a photo-composing machine, of means for supporting a sensitized plate, a negative holding frame, means for moving said negative holding frame away from said sensitized plate to permit relative movement of said frame and said plate in a plane parallel to the surface of said plate, and additional electro-magnetic means for controlling the return movement of said frame toward said plate holding means.

25. The combination in a photo-composing machine, of means for supporting a sensitized plate in a horizontal position, a negative holding frame for holding a negative in a plane parallel to said sensitized plate, means for effecting relative separation of said negative holding frame and said plate supporting means for permitting relative movement thereof in a plane parallel to the surface of said plate, and electro-magnetic means operative after said relative separation has taken place for controlling the return movement whereby said sensitized plate and said negative are brought into contact.

26. The combination in a photo-composing machine, of means for supporting a sensitized plate, a negative moving structure comprising oppositely disposed movable guiding members, a pin extending upwardly from one of said guiding members, a notched member carried by the other of said guiding members, and a negative carrying frame having a hole to be engaged by said pin and having a lug to engage the notch in said notched member.

27. The combination in a photo-composing machine, of means for supporting a sensitized plate, a negative moving structure comprising oppositely disposed movable guiding members, a pin extending upwardly from one of said guiding members, a notched member carried by the other of said guiding members, a negative carrying frame having a hole to be engaged by said pin and having a lug to engage the notch in said notched member, and means for elevating said negative carrying frame out of engagement with the sensitized plate without disengaging said pin from said aperture and without disengaging said lug from said notch.

ALEXANDER T. KOPPE.